United States Patent [19]

Seib

[11] Patent Number: 5,350,982
[45] Date of Patent: Sep. 27, 1994

[54] MOTORIZED GOLF BAG CART CIRCUIT AND APPARATUS

[76] Inventor: James N. Seib, Rte. 1, Williams, Ind. 47470

[21] Appl. No.: 991,866

[22] Filed: Dec. 16, 1992

[51] Int. Cl.$^5$ ............................ H02P 1/54; H02P 3/08
[52] U.S. Cl. ...................................... 318/139; 318/62; 318/265; 318/375; 318/431; 318/446; 318/479
[58] Field of Search ............... 318/560, 561, 563, 580, 318/583, 139, 375, 379, 380, 434, 445, 446, 484, 16, 53, 59, 60, 62, 63, 265, 431, 479; 364/424.01

[56] References Cited

U.S. PATENT DOCUMENTS

| | | | |
|---|---|---|---|
| 3,507,350 | 4/1970 | Boyajian | |
| 3,731,756 | 5/1973 | Hajec | |
| 3,871,464 | 3/1975 | Eden | |
| 4,081,047 | 3/1978 | Lovell et al. | |
| 4,099,105 | 7/1978 | McAuliffe | 318/139 |
| 4,109,186 | 8/1978 | Farque | 318/587 |
| 4,556,940 | 12/1985 | Katoo et al. | 364/424 |
| 4,570,731 | 2/1986 | Oaks | 180/19.3 |
| 4,570,732 | 2/1986 | Craven | 180/19.3 |
| 4,844,493 | 7/1989 | Kramer | 180/169 |
| 4,926,161 | 5/1990 | Cupp | 340/572 |
| 4,974,693 | 12/1990 | Nakai et al. | 180/19.3 |
| 5,095,430 | 3/1992 | Bonito et al. | 364/410 |
| 5,097,416 | 3/1992 | Matthews | 364/410 |
| 5,126,641 | 6/1992 | Hoel | 368/10 |
| 5,167,389 | 12/1992 | Reimers | 248/96 |
| 5,214,679 | 5/1993 | Metcalf | 377/5 |

FOREIGN PATENT DOCUMENTS 2221661 2/1990 United Kingdom .

OTHER PUBLICATIONS

Brochure: "Navigator 900 and Powakaddy", Robo Group, International Inc., Indianapolis, Indiana.
Brochure: "Kangaroo", by Farnum, Hollis B., Ph.D., Kangaroo Products Company, Columbus, North Carolina.
Brochure: "Sail with the Fleet", Lectronic Kaddy.

*Primary Examiner*—Bentsu Ro
*Attorney, Agent, or Firm*—Woodard, Emhardt, Naughton, Moriarty & McNett

[57] ABSTRACT

A motorized golf cart circuit and apparatus capable of transporting various golf related items including a golf bag carrying golf clubs around a golf course under manual or automatic control is provided. The cart operator is provided with the option of operating the cart either manually by applying pressure to a switch located on the hand grip of the cart apparatus, or automatically in either a timer or a distance travel mode. The timer mode allows the cart operator to send the cart ahead automatically along a straight or curved path set by the operator for a predetermined period of time before the cart circuit automatically turns off. The distance mode of travel allows the cart operator to automatically send the cart ahead, following either a straight or curved path set by the operator for a distance of between 10 and 50 yards. Both the speed and the path of the cart may be varied by the cart operator by turning a balance control knob located on the control panel interface of the golf club cart. A battery safeguard feature ensures that the cart circuit and apparatus is disabled if a battery powering the cart has been incorrectly connected with the cart circuit. Power-on initialization circuitry prevents the cart circuit from operating immediately after the battery or connector plug is connected with the circuit, regardless of the positions of the control panel switches. The cart circuit also includes a "soft-start" feature for preventing the golf cart apparatus from immediately lurching forward upon receipt of a start command from the cart operator.

21 Claims, 7 Drawing Sheets

MOTORIZED GOLF BAG CART CIRCUIT AND APPARATUS

BACKGROUND OF THE INVENTION

This invention relates generally to the field of motorized carts and more specifically to a motorized golf bag cart circuit and apparatus operable under both manual and automatic control.

Often when a person ventures out onto the golf course with the hopes of playing a relaxing game of golf they are faced with the question of how to transport their golf clubs around the golf course. Additionally, many golfers prefer to walk the course, rather than ride in the motorized carts provided by many golf courses. However, a full golf bag containing clubs and other golfing supplies can easily weigh in excess of thirty pounds. As such, various motorized golf club cart devices have been developed that will allow a golfer to walk the golf course while transporting his golf clubs using only a minimum of effort.

U.S. Pat. No. 3,731,756 discloses a motorized golf cart or the like which has controls for stepless speed regulation and which utilizes a cord control that follows the user, and wherein the speed is dependent upon the extension of a cord. Turning is accomplished by differential electrical controls of the drive wheels initiated by sensing the direction that the control cord or cords are extending from the control unit. Additionally, the motors can have dynamic braking to slow down the cart.

U.S. Pat. No. 3,871,464 discloses a self-propelled golf bag cart having a pair of transversely spaced rear wheels which are separately powered by electric motors, and wherein, variable speed is affected by control member movably carried upon the handle.

U.S. Pat. No. 4,081,047 discloses a motorized cart comprising a wheeled frame, a shroud, and a dirigible free-ended handle, said handle having a longitudinally movable handle grip at the free end thereof, the handgrip having connected thereto means increasing and decreasing the speed of the cart depending only on the pull of the user on the hand grip. There is an automatic brake rendering the cart immobile upon stopping; and a separate brake preventing the cart from sliding rearwardly downhill.

U.S. Pat. No. 4,570,731 discloses the golf bag cart that remains under ready light finger control of the player for a ready change in direction in usual manner, but when desired, the player may through a flexible control connection not only permit the cart to be self-powered as the player walks along the course, but also affects steering guidance through the control connection. The control handle assembly includes a handle or grip portion and a trigger-like lever, and the golfer readily manually grasps the control handle assembly and squeezes the lever to close the switch in the handle assembly and suitably energize the motor to propel the cart forwardly. The control panel also includes a knob which may be associated with a variable resistance rheostat element thereby to initially set, as may be convenient to the golfer, a desired level of speed as a function of power from the battery to the motor.

U.S. Pat. No. 4,570,732 discloses a motor driven golf bag cart having a control circuit including a variable speed control by which the operator can control both the motor speed and its direction with the motor speed controlled by turning the handle to establish a selected rate of travel and motor direction controlled by a separate switch.

U.S. Pat. No. 4,844,493 discloses a remotely controlled vehicle preferably configured as a golf cart controlled by two independent driving motors operably connected each to one of the wheels. Power units are powered from the battery by a high current DC chopper which delivers the required voltage unit as required to obtain the desired speed and direction. If the same voltage is fed to both power units the cart moves in essentially a straight line. If the voltage to the motor driving, say, the right wheel is increased and/or the voltage to the motor driving left wheel is decreased then the vehicle turns to the left. The main control module generally includes circuitry to achieve a variety of functions including a jerk limiter to prevent "jack rabbit" starts and provide smoother acceleration. Additionally, dynamic braking circuits also may be included to connect a low value brake resistor across the motor terminals whenever the command voltage drops to zero.

U.S. Pat. No. 4,974,693 discloses a three-wheeled golf cart powered by an internal combustion engine that is disposed within a triangle defined by the contact patch of the wheels with the ground to provide stability. An improved variable speed belt transmission and combined reduction set and differential drive the wheels of the cart from the engine.

British Patent Application 2 221 661 A discloses a remotely controlled golf cart or trolley on endless tracks having variable resistors that control the speed and steering of the cart. Any speed from zero to full speed is obtainable; speed can be changed progressively and smoothly.

Additionally, Robo Group International, Incorporated, Indianapolis, Ind., markets a number of motor driven carts having a number of features including an optional fifty-five second timer which lets you send the golf cart on ahead, variable speed control adjusts with single finger or thumb movement, micro-chip driven controls and battery condition indicator. Additionally, the Navigator 900 advertised by Robo Group has infinite speed selection and a 360 degree turning capability.

Lectronic Kaddy advertises a golf club cart having distance buttons, variable speed control, battery strength indicator and a brake for electronic assistance going down hills.

Kangaroo Products Company, Columbus, N.C., offers for sale several types of golf club carts having speed control that allows the operator to walk at their own pace, an on/off switch that allows the operator to stop and go without resetting the speed control, distance timer which allows the operator to send the cart ahead up to 100 yards, and a dynamic brake that lets the operator brake going downhill with just the press of a thumb.

Many of the golf club cart devices shown in the prior art are very costly to the golfer due to the complicated digital electronics used to make them. Additionally, the prior art devices, in addition to being expensive, only offer a golfer a limited number of cart features and modes of operation.

It is therefore desirable to have a motorized golf bag cart that offers a golfer a wide variety of cart features and modes of operation while being inexpensive to produce.

SUMMARY OF THE INVENTION

Briefly describing one aspect of the present invention a motorized golf bag cart circuit and apparatus is provided that is operable both manually, under the supervision of the cart operator, or in a variety of automatic modes wherein the cart may be allowed to travel, unsupervised, either for a distance designated by the cart operator or for a predetermined period of time. Additionally, the speed and direction of the golf bag cart circuit and apparatus may be controlled by adjusting settings on the control panel interface to cause the golf bag cart apparatus to travel along either a straight or a curved path when operating in either the manual or automatic modes of operation.

Another object of the present invention is to provide a motorized golf bag cart circuit and apparatus that will not pose a hazard to the cart operator. Timer and distance circuitry is provided that only allows the golf bag cart apparatus to operate in an automatic mode, unsupervised by the cart operator, for a predetermined amount of time or for a designated distance of travel before the cart circuitry automatically turns off, thus stopping the cart. Also, a power-on initialization circuit is provided that prevents the cart apparatus from unintentionally starting upon reconnection of the battery, absent a further command from an operator and regardless of the switch positions at the control panel interface. An additional safety feature of the present invention is to provide "soft-start" circuitry to prevent the cart apparatus from lurching forward upon receipt of a start command from an operator, thus preventing injury to a cart operator holding onto the handle grips of the cart apparatus.

Another object of the present invention is to provide a golf bag cart circuit and apparatus having a battery safeguard that will disable the cart circuitry if a battery used to power the cart has been incorrectly connected with the golf bag cart circuit.

An additional object of the present invention is to provide a golf bag cart circuit and apparatus with a visual indicator which operates to warn an operator of the cart apparatus when the voltage level of a battery providing power to the cart apparatus has dropped below a predetermined level.

A further object of the present invention is to provide a golf bag cart circuit and apparatus that offers the operator a wide variety of features and different modes of operation while remaining relatively inexpensive to produce.

Further objects and advantages of the present invention may be discerned by persons of ordinary skill in the art after reviewing the following written description and accompanying figures.

DESCRIPTION OF THE PREFERRED EMBODIMENT

Figure 1:
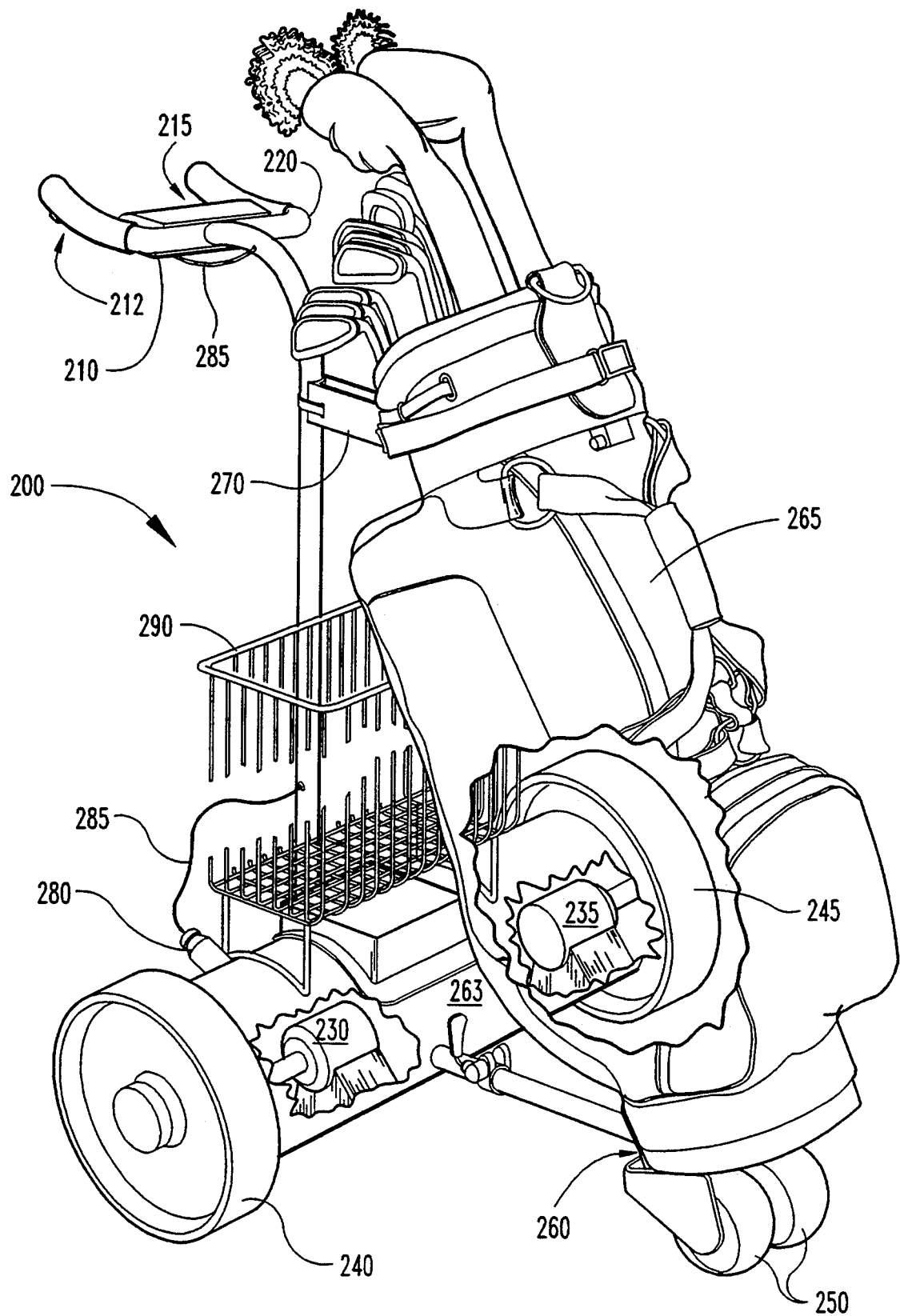
FIG. 1 is an isometric view of a motorized cart for carrying golf bags and other objects including a cut-away view of the motorized cart showing two electrical motors present within the cart in accordance with one embodiment of the present invention.

Returning now to FIG. 1 there is shown a motorized golf bag cart in accordance with the preferred embodiment of the present invention. The motorized golf bag cart or cart 200 operates to carry a bag of golf clubs 265 around a golf course. Cart 200 may be operated either manually by the cart operator or in an automatic mode selected by the operator. FIG. 1 shows cart 200 having a base portion 263 and a handle portion 220. Base portion 263 has a saddle portion 260 provided for supporting golf bag 265. Additional support for golf bag 265 is provided by support bar 270 which projects from handle 220 to maintain the golf bag 265 in a tilted upright position. Wheels 240, 245 and 250 are arranged in a triangular configuration around body portion 263. Main wheels 240 and 245 are supported along the main portion of the body 263. Wheels 250 are located beneath the portion of the body 263 having saddle portion 260 for supporting the golf bag 265. A portion of the body portion 263 of cart 200 shown in FIG. 1 has been cut away to reveal the electrical motors 230 and 235 which operate to turn wheels 240 and 245.

Attached to handle 220 there is a control panel 210 having a control panel interface 215 used by an operator to send instructions to operate circuitry located within the cart 200 to control the movement of the cart 200. Control panel 210 is electrically connected to the internal electrical circuitry via conductor 285 and connector plug 280 through which control signals are relayed from the control panel to the electrical circuitry within the body portion 263 of the motorized cart 200. Also attached to the handle portion 220 is a 0.020 thick switch 212 buried strategically under the vinyl handle grip so that the cart may be operated manually when in the "handle" mode by the application of thumb or hand pressure on the cart handle. Connected to handle portion 220 and body portion 263 is a wire basket 290 that may be used for carrying assorted golfing supplies and other miscellaneous items. A battery 281 (not shown in FIG. 1) is positioned below the wire basket 290.

Figure 2:
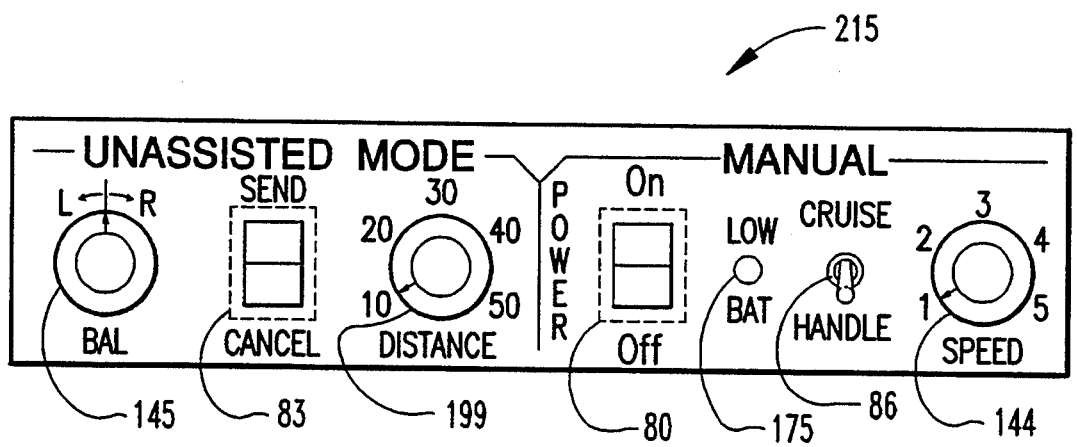
FIG. 2 is a front elevational view of the control panel interface used by the operator to control the operation of a motorized cart in accordance with the preferred embodiment of the present invention such as is shown in FIG. 1.

In FIG. 2 there is shown the control panel interface 215 of control panel 210 (FIG. 1) used by an operator to control the operation of a motorized cart 200 in accordance with the preferred embodiment of the present invention. The control panel interface portion 215 shows the different options available to an operator for operation of the motorized cart 200. Main power switch 80 is the main power on/off switch for the motorized cart 200. Send/cancel switch 83 is a momentary switch in both directions (momentary-off-momentary) which permits the cart operator to "send" the cart forward automatically for a distance determined by the operator, and, additionally, allows the operator to "cancel" the "send" mode of operation before the cart has fully traveled the designated distance. The "send" mode of operation utilizes variable timer circuitry to move the cart 200 for a set amount of time corresponding to a desired distance of travel. Distance control knob 199 is turned by the operator to select the desired distance which the cart is to travel when in the "send" mode of operation. The distance control knob 199 of the present invention permits the cart operator to select a distance between 10 and 50 yards of travel before the cart is automatically turned off. The operator, walking alongside the cart 200, may depress the send/cancel switch 83 to the "cancel" position at any time during the "send" mode of operation to stop the cart. Additionally, there is provided a left/right balance knob 145 that may be adjusted by the operator to cause the cart 200 to leave its normally straight path and to travel either to the left or to the right to follow a curved path. The operator may determine the curved path followed by the cart within the limitations of the operator's personal skill in operating the left/right balance knob 145.

Additionally, as shown in FIG. 2, control panel interface 215 includes a speed control knob 144 for controlling the speed at which the cart travels, a cruise/handle toggle switch 86, (cruise-none-handle), for designating whether the cart shall operate in a manual "handle" mode using handle switch 212 or in an automatic "cruise" mode. A low battery indicator 175 is provided for indicating when the golf cart battery is below a predetermined level. When toggle switch 86 is placed by an operator into the "cruise" position, the cart will operate for approximately three minutes and then automatically turn "off". The cart may again be placed in the "cruise" mode by replacing the toggle switch 86 to the "handle" position and then back to the "cruise" position. When toggle switch 86 is in the "handle" position, the cart may be operated automatically in the "send" mode or manually in the "handle" mode by applying pressure to the pressure switch 212.

Figure 3:
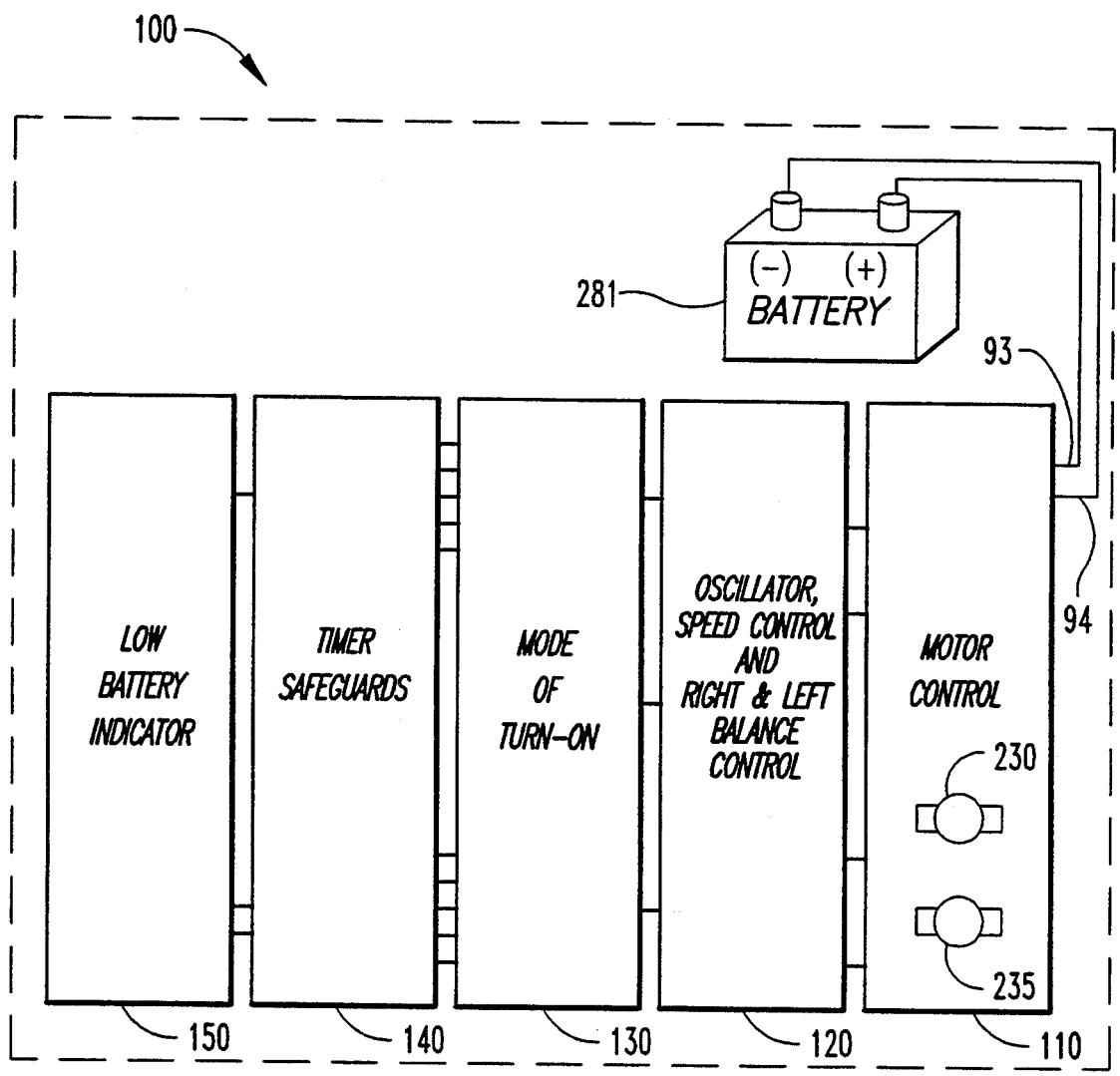
FIG. 3 is a block diagram of the motorized golf cart circuit used in FIG. 1, which invention is capable of moving a motorized cart for carrying golf bags and other objects automatically or manually under the instruction of an operator.

Referring now to FIG. 3 there is shown a block diagram of a cart circuit 100 in accordance with the preferred embodiment of the present invention. Cart circuit 100 is illustrated through five related circuitry portions that control various aspects of the operation of the motorized cart 200. The motor control circuitry 110 portion of cart circuit 100 controls the operation of the electrical motors 230 and 235 and additionally provides the cart with dynamic braking when the motors 230 and 235 are "off". The oscillator, speed control and right/left balance control circuitry, otherwise known as oscillator circuitry 120, provides an operating signal to the motor control circuitry 110 that controls the speed and operation of each individual motor 230 and 235. By controlling the speed of each motor 230 and 235 proportionally with respect to the other, the oscillator circuitry 120 allows the cart 200 to follow either a straight or a curved path.

The mode of turn-on circuitry 130 is used to turn the motor control circuitry 110 as well as the oscillator circuitry 120 "on" or "off". The cruise, send/cancel, and handle control circuitry 140 controls when the mode of turn-on circuitry 130 is turned "on" and determines the duration of operation of the cart 200 in the "send", "cruise" and "handle" modes of operation. Finally, low battery indicator circuitry 150 is provided to indicate when the voltage supplied by the battery 281 powering the cart circuit 100 has dropped below a predetermined level.

Figure 4:
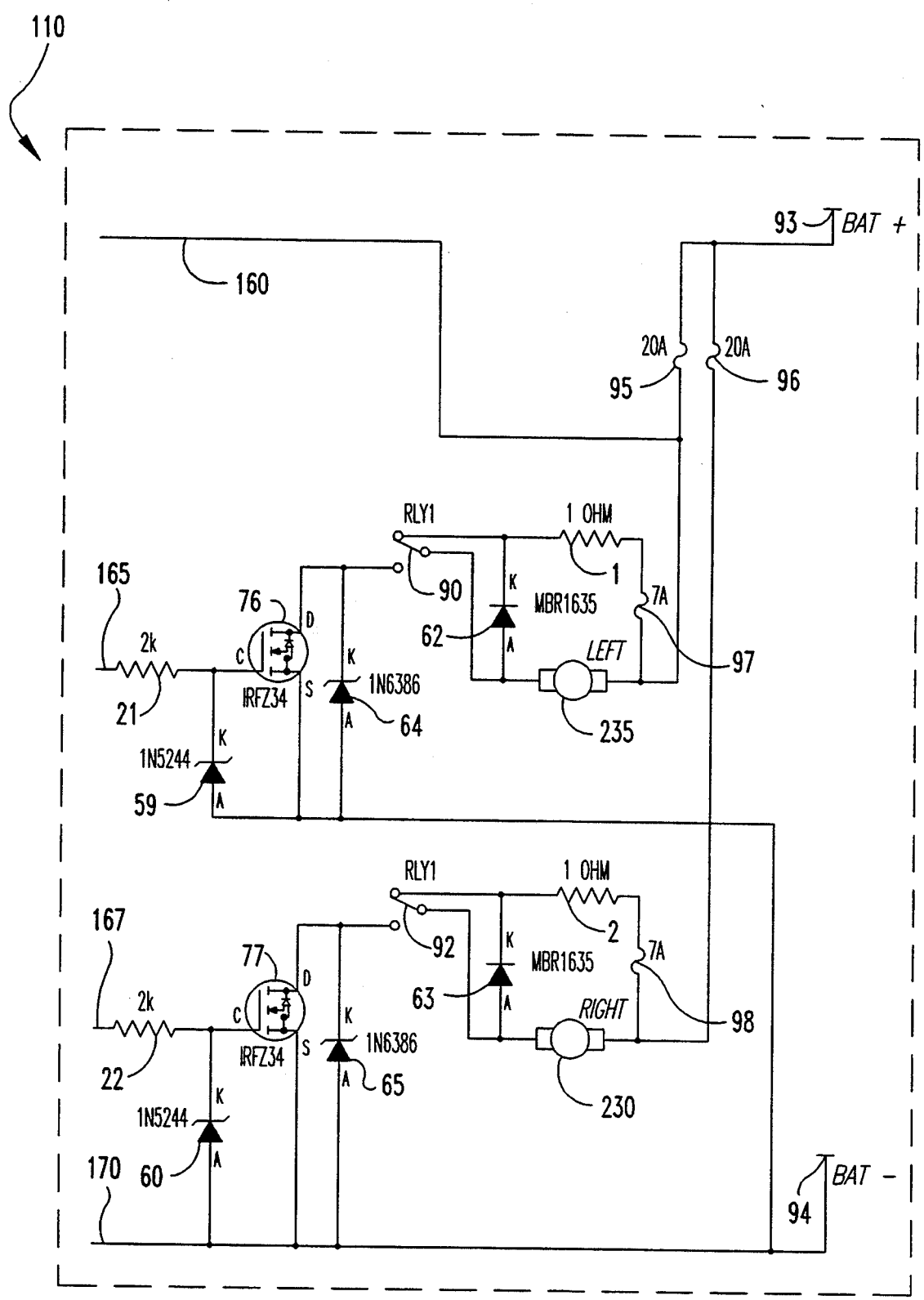
FIG. 4 is a schematic diagram of the motor control circuitry portion of the circuit of FIG. 3, which circuitry portion is used to directly control two electrical motors and cause the wheels of the motorized cart to turn.

Referring now to FIG. 4, there is shown an electrical schematic of the motor control circuitry 110 of the cart circuit 100. FIG. 4 shows a positive battery terminal 93 and a negative battery terminal 94, between which battery 281 (FIG. 3) is connected. Connected to the positive battery terminal 93 are two 20 amp fuses 95 and 96 for protecting the circuitry from excessive current flow from the battery. Fuse 96 is connected in series between the positive battery terminal 93 and the right side motor circuit. Fuse 95 is connected between the positive battery terminal 93 and the left side motor circuit. Additionally conductor 160 is connected to the positive battery terminal 93 through fuse 95.

The left side and right side motor circuit portions of the motor control circuitry 110 are identical to each other. The left side motor circuit includes an electrical motor 235, a fuse 97 for limiting the braking current flow through the motor circuit, a one ohm resistor 1 for providing dynamic braking to the cart 200 when the motor control circuitry 110 is "off", a diode 62 connected between the one ohm dynamic braking resistor and the motor 235 and a normally open single-pole, double-throw relay contact arm 90 shown in its normally open position.

Likewise, right side motor control circuit correspondingly includes an electrical motor 230, a fuse 98, a one ohm resistor 2, a diode 63 connected between the one ohm braking resistor and the motor 230 and a normally open single-pole, double throw relay contact 92 shown in its normally open position. When the relay contact arms 90 and 92 are in their normally open position, the motors 230 and 235 will be off and ideally wheels 240 and 245 (FIG. 1) will not turn. However, when the cart is present on an incline, the weight of the cart, battery and golf clubs may force the cart to roll forward causing the motors 230 and 235 to overrun and to generate a small current. This current will appear as a voltage drop across dynamic braking resistors 1 and 2 and will result in dynamic braking of the motors. Thus, the cart will not roll freely but will be inhibited by electrical dynamic braking so that when the relay contacts are open, the cart will not readily move. The brakes may also be used when the cart is intentionally powered downhill. When the cart is in the "handle" mode of operation, an operator may purposefully power the cart downhill without the danger of runaway by pulsing the thumb switch 212.

The output of the oscillator circuitry 120 (shown in FIGS. 3 and 5) is input to the motor control circuitry 110 via conductors 165 and 167. Conductor 165 has connected in series therewith a resistor 21 which is connected to the gate of an n-channel enhancement mode MOSFET 76. Zener diode 59 is connected between the gate of MOSFET 76 and the negative battery terminal 94. Additionally, a zener diode 64 is connected in parallel between the drain and source contacts of MOSFET 76. Both the source of MOSFET 76 and the anode of zener diode 64 are tied to the negative battery terminal 94. When the relay contact arm of relay contact 90 is closed and a voltage is present at the gate of MOSFET 76, a channel will open from the drain to the source of MOSFET 76 creating a conduction path through the left side motor circuit enabling electrical motor 235 to be turned "on".

Similarly, conductor 167 has connected in series therewith a resistor 22 which is connected to the the gate of an n-channel enhancement mode MOSFET 77. Zener diode 60 is connected between the gate of MOSFET 77 and the negative battery terminal 94. Additionally, a zener diode 65 is connected in parallel between the drain and source contacts of MOSFET 77. Both the source of MOSFET 77 and the anode of zener diode 65 are tied to the negative battery terminal 94. When the relay contact arm of relay contact 91 is closed and a voltage is present at the gate of MOSFET 77, a channel will open from the drain to the source of MOSFET 77 creating a conduction path through the right side motor circuit enabling electrical motor 230 to be turned "on".

Figure 5:
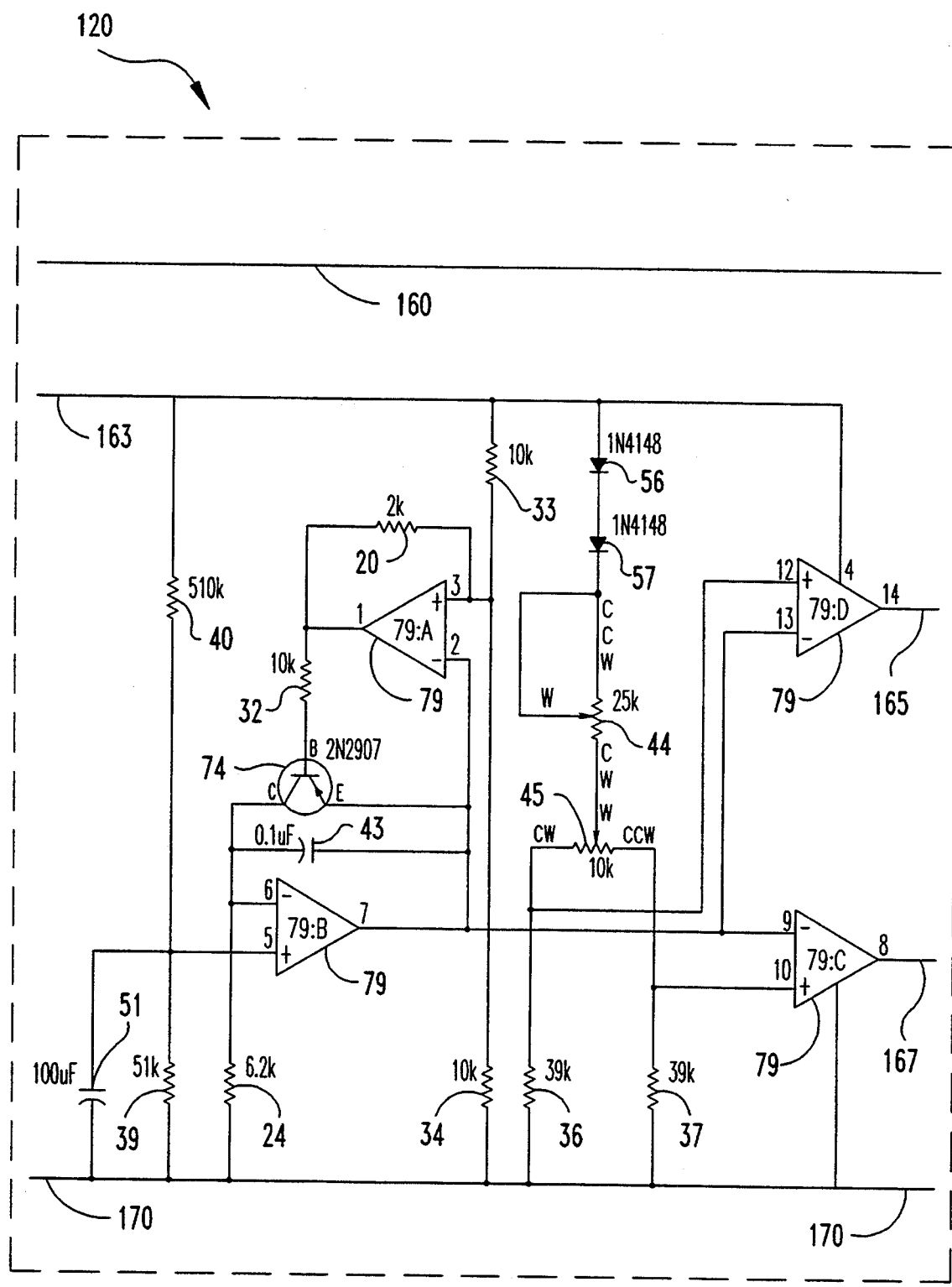
FIG. 5 is a schematic diagram of the oscillator, speed control and right/left balance control circuitry portion of the golf cart circuit of the present invention, which circuitry portion supplies a signal that dictates the speed and direction of the cart to the motor control circuitry of FIG. 4.

Referring to FIG. 5, the input signals provided to the motor control circuitry 110 from the oscillator circuitry 120 via conductors 165 and 167 are outputted from operational amplifiers 79C and 79D of the oscillator circuitry 120. FIG. 5 illustrates the oscillator, speed control and right/left balance control circuitry or oscillator control circuitry 120. Conductor 160 simply provides an electrical connection between the motor turn-on circuitry 130 and the motor control circuitry 110. When implementing cart circuit 100 analog circuit components are preferred so as to be less expensive to produce than other electrical cart circuits implemented using microprocessors and other digital logic techniques. As such, the cart circuit 100 is implemented using two 14-pin quad operational amplifier chips 78 and 79 such as the MC4741C made by Motorola. Depending upon the state of transistor 75 in FIG. 6, the conductor 163 may provide power to the oscillator circuitry 120. Additionally, conductor 163 may provide an input to the +VCC terminal of the quad operational amplifier (op-amp) chip 79. Conductor 170, which is connected to the negative battery terminal 94 as shown in FIG. 4, is connected to the −VCC terminal of the quad op-amp chip 79. Op-amps 79A and 79B, resistors 20, 24, 32, 33 and 34, pnp transistor 74 and a 0.01 UF capacitor 43 form the saw-tooth oscillator portion of oscillator circuitry 120. A voltage divider including resistors 33 and 34 provides an input signal to the non-inverting terminal of op-amp 79A. The output of op-amp 79B provides the drive signals used to control electrical motors 230 and 235.

The collector terminal of transistor 74 is connected to the inverting input of op-amp 79B, thus providing an oscillatory signal at the inverting input of op-amp 79B. The output terminal of op-amp 79B provides a signal to the emitter of transistor 74, capacitor 43 and the inverting input terminal of op-amp 79A. Additionally, the output of op-amp 79B is provided to the inverting terminals of op-amps 79C and 79D.

The cart circuit 100 has a "soft-start" safety feature that allows the cart to start slowly initially upon start-up so as not to lurch forward suddenly, potentially injuring or annoying the operator holding on to the handle grip of the cart 200. The non-inverting input of op-amp 79B is connected between resistor 40 and the parallel combination of resistor 39 and capacitor 51. Initially, when transistor 75 (FIG. 6) is conducting, capacitor 51 is charged through resistor 40 causing a changing voltage to appear at the non-inverting input of op-amp 79B, resulting in a frequency increasing output signal at the output terminal of op-amp 79B. This causes the frequency of the oscillator to be slowly ramped up from 20 Hz to approximately 230 Hz, ensuring that upon start up the cart does not lurch forward, but rather, starts slowly, eventually reaching it's final rate of speed. Once the capacitor 51 is fully charged, a constant signal is provided to the non-inverting input of op-amp 79B by the voltage divider comprising resistors 40 and 39. When the transistor 75 is not conducting, capacitor 51 discharges through resistor 39 which assures a "soft start" when transistor 75 is again turned on.

Additionally shown in FIG. 5 are the speed and left/right balance controls of the oscillator, speed control and left/right balance circuitry 120. Diodes 56 and 57 are connected in series between conductor 163 and the wiper of speed control potentiometer 44 and provide for a voltage drop through the circuit. The speed of each motor, individually, is controlled by the series connection of speed control potentiometer 44 and balance control potentiometer 45. Speed control potentiometer 44 can be varied to change the speed of both motors 230 and 235 equally. Right/left balance control potentiometer 45 may be varied to increase the speed of one motor while decreasing the speed of the other resulting in the cart 200 following a curved path. The rate of speed at which the cart 200 travels can be varied by adjusting the speed control knob 144 on the control panel interface 215 of control panel 210 (FIG. 2) which moves the wiper of speed control potentiometer 44. The output of the speed control potentiometer 44 is inputted to the wiper of a right/left balance potentiometer 45. Right/left balance potentiometer 45 is normally set at the center position to deliver equal power to the left and right motors for a straight path deployment. Adjusting the left/right balance control knob 145 (FIG. 2) moves the wiper of left/right balance control potentiometer 45 clockwise or counterclockwise. By varying the wiper of the left/right balance control potentiometer 45, the power supplied to each motor may be inversely proportioned with respect to the other, causing one motor to turn faster and the other slower, resulting in the turning of the cart 200.

A voltage divider comprising potentiometer 44, potentiometer 45, and resistor 36 provides an input signal to the non-inverting input of op-amp 79D. Likewise, a voltage divider comprising potentiometer 44, potentiometer 45, and resistor 37 provides an input signal to the non-inverting input of op-amp 79C. If the wiper of potentiometer 45 is turned all the way in either the clockwise or counterclockwise direction, the minimum motor speed is set by the potentiometer 44 and either resistor 36 or 37, depending on which direction the wiper is turned. As stated above, an input signal from the output of op-amp 79B is supplied to the inverting input terminals of the op-amps 79C and 79D. The strength of the output signal of op-amps 79C and 79D controls MOSFETs 77 and 76 (FIG. 4), thus controlling the speeds of motors 230 and 235, respectively.

Figure 6:
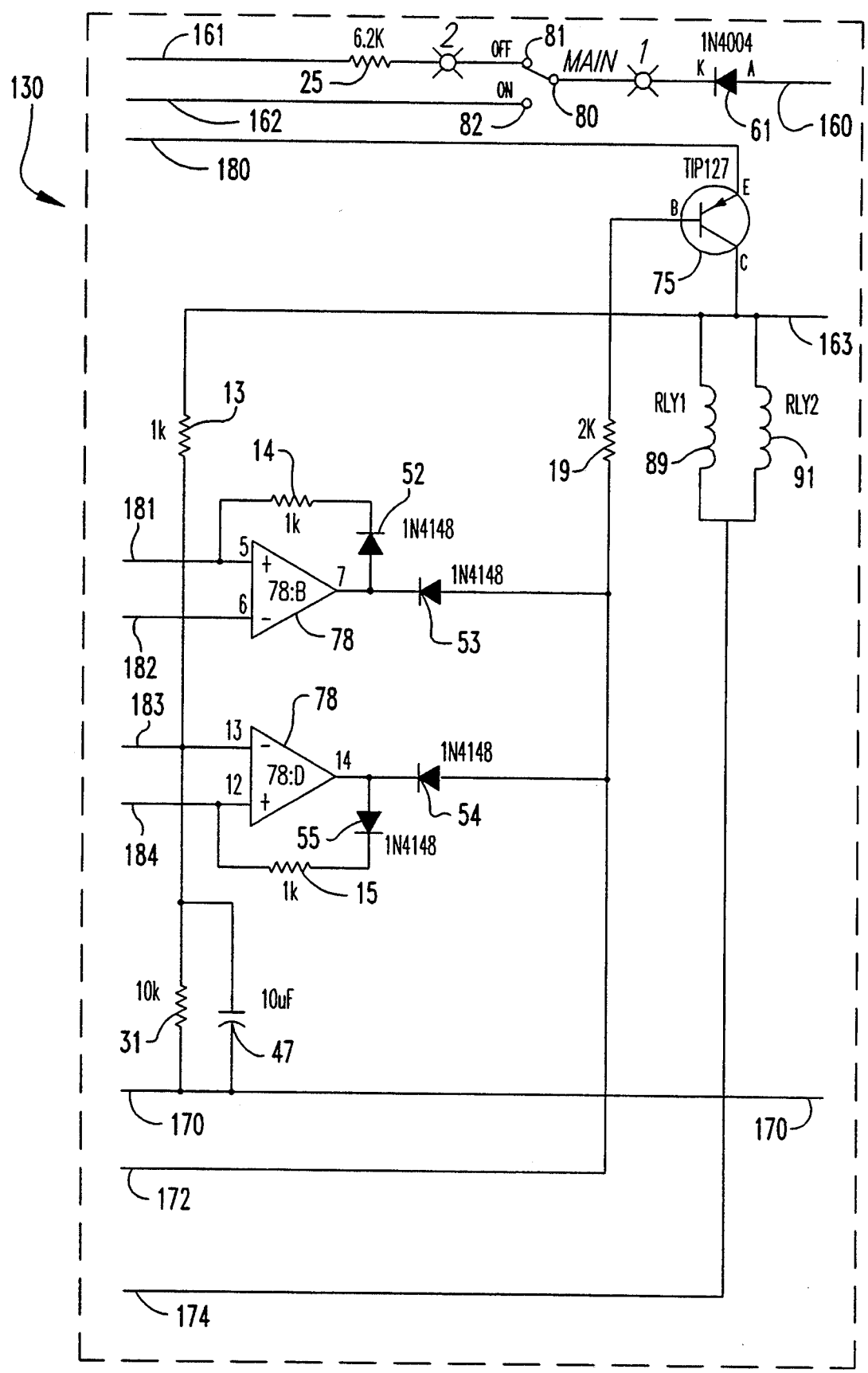
FIGS. 6 and 7 are schematic diagrams of the mode of turn-on circuitry portion and the cruise, send/cancel, and handle control circuitry portion of the golf cart circuit of the present invention, which circuitry portions together control when a signal instructing the motorized cart to move will be relayed to the cart circuit portions shown in FIGS. 4 and 5.
Figure 7:
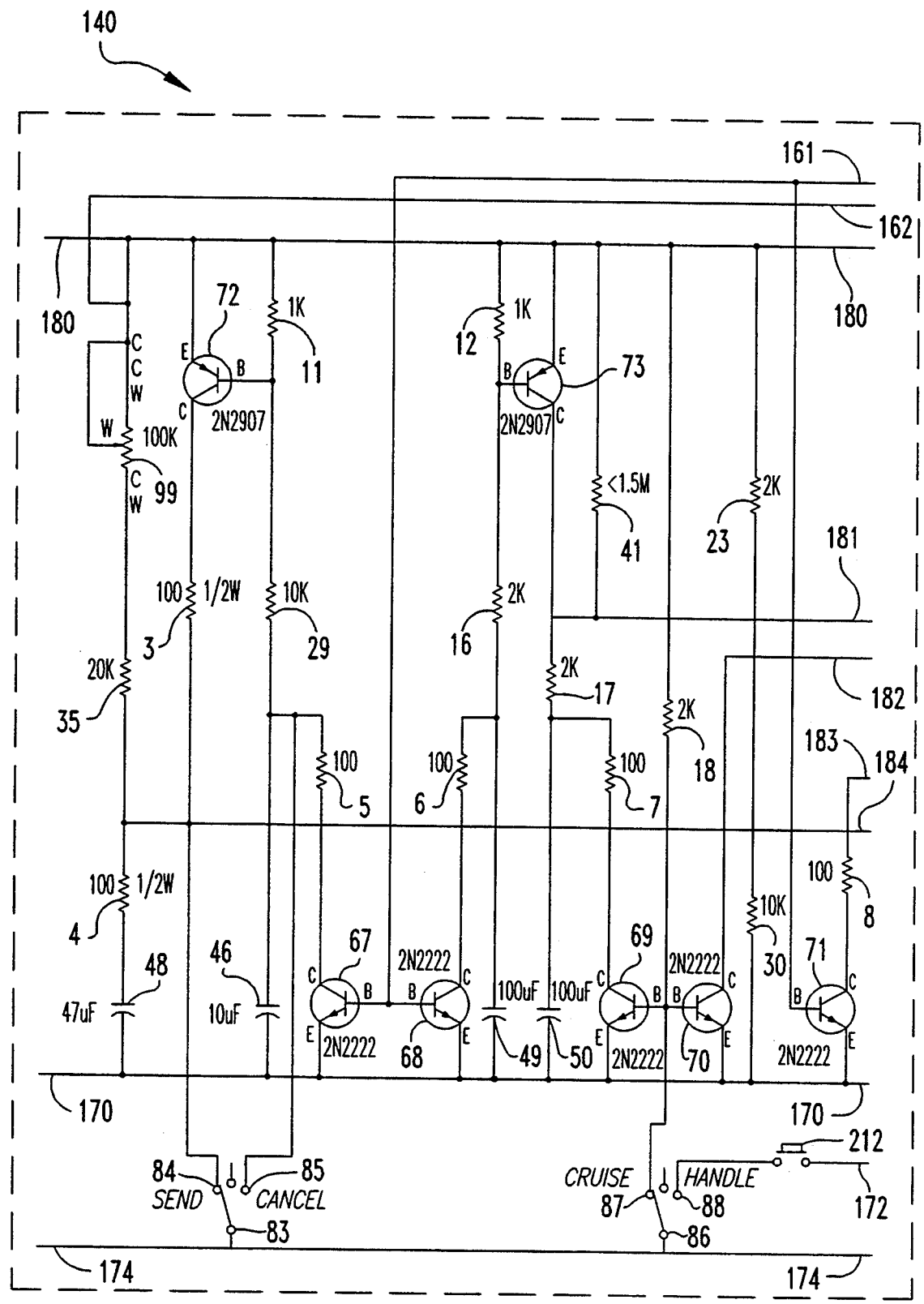

FIG. 6 shows the mode of turn-on circuitry, otherwise known as the turn-on circuitry 130, while FIG. 7 shows the cruise, send/cancel and handle control circuitry or cruise circuitry 140 of cart circuit 100. The cruise circuitry 140 of FIG. 7 is closely related to the turn-on circuitry 130 of FIG. 6, and as such, FIGS. 6 and 7 will be described together. As shown in FIG. 6, conductor 160 is connected to the anode of a diode 61. Diode 61 provides the circuit with an additional battery safeguard to insure that the cart circuit 100 will only operate if the battery is correctly connected with the circuit. If the battery for the cart circuit 100 is incorrectly connected to the cart circuit, resulting in reversed polarities at positive battery terminal 93 and negative battery terminal 94, the diode 61 will be reverse biased and the cart circuit 100 will be disabled. The cathode of battery protection diode 61 is connected to the single-pole of the single-pole, double-throw main power switch 80. When the contact arm of main power switch 80 is in the "off" position 81 minimal power is still supplied to certain portions of the circuit via conductor 161, however, motors 230 and 235 will not turn "on". Resistor 25, connected in series with conductor 161, provides a resistance to the bases of npn transistors 67, 68 and 71 shown in FIG. 7. When the main power switch 80 is "off", transistor 71 will conduct causing capacitor 47 (FIG. 6) to discharge. Similarly, when the main power switch 80 is "off," transistors 67 and 68 will also conduct, allowing capacitors 46 and 49 to discharge, thus preparing the circuit for start-up operation.

When the main power switch 80 is turned to the "on" position 82, conductor 162 is supplied with power. At this time the cart 200 may be operated either manually or in one of the two automatic modes.

Conductor 162 provides power to conductor 180. Conductor 180 is connected to the emitter of pnp transistor 75. It is transistor 75 that controls the turn-on circuitry 130. The state of transistor 75 determines whether or not the motor circuits are turned "on" and the cart is moving. When transistor 75 is conducting, or turned "on", the motors 230 and 235 of FIG. 4 are engaged. When transistor 75 is not conducting, or "off", relay contacts 90 and 92 are open and the oscillator circuitry 120 and the motor control circuitry 110 are "off."

When transistor 75 is conducting, collector current flows through relay coils 89 and 91, which causes relay contact arms 90 and 92 to be closed (FIG. 4). Additionally, the collector terminal of transistor 75 is connected to conductor 163 which, as shown in FIG. 5, provides power to the oscillator circuit 120. A resistor 19 is connected in series with the base of transistor 75.

Referring now to FIGS. 6 and 7, it will be shown that transistor 75 may be made to conduct in three ways: (1) in the "handle" mode; (2) in the "send" mode; and (3) in the "cruise" mode.

"Handle" Mode Operation

Cart circuit 100 can be placed into the "handle" mode by causing the toggle switch 86 to be in the "handle" position 88. When the cart is in the "handle" mode, an operator may manually operate cart 200 by applying pressure to a normally open pressure switch 212. In the "handle" mode the cart will continue to move as long as the main power switch 80 is "on" and the operator continues to apply pressure to the pressure switch 212. As can be seen by FIGS. 6 and 7, when the main power switch 80 is "on" and switch 86 is in the "handle" position, closing pressure switch 212 will connect conductor 172 to the negative battery terminal 94, causing transistor 75 to conduct. This results in the closing of relay contacts 90 and 92 (FIG. 3) and turns on both the oscillator circuitry 120 and motor control circuitry 110.

Pressure switch 212 is closed by applying thumb or hand pressure to the switch 212 located on handle 220 of cart 200 (FIG. 1).

"Send" Mode Operation

The automatic "send" command is initiated by pressing send/cancel switch 83 on the interface 215 of control panel 210. The send/cancel switch 83 is a momentary switch having a floating middle position (momentary-off-momentary). When pressed into the "send" position 84, motorized cart 200 is sent forward automatically along either a straight or a curved path for a distance between 10 and 50 yards, depending upon the setting of the distance knob 199 (FIG. 2) allowing the operator to remove his or her hands from the cart 200. When pressed into the "cancel" position 85, motorized cart 200 stops moving. When the send/cancel switch 84 is released, the contact arm automatically returns to the floating middle position.

The send/cancel mode of cart circuitry 100 comprises a potentiometer 99, pnp transistors 72 and 75, npn transistors 67 and 71, op-amp 78D, diodes 54 and 55, resistors 3, 4, 5, 8, 11, 13, 15, 29, 31 and 35, capacitors 46, 47 and 48, send/cancel switch 83 and conductors 183 and 184 as shown. Like quad op-amp 79 described herein quad op-amp 78 is a fourteen pin quad operational amplifier chip. Op-amp 78D is configured having a hysteresis feedback loop connected between the output terminal and the non-inverting input terminal, through the diode 55 and the resistor 15. The output terminal of operational amplifier 78D is connected to the cathode of a diode 54, the anode of which is connected through resistor 19 to the base of transistor 75. The inverting input of op-amp 78D is connected between the resistor 13 which is connected to the collector of transistor 75, and the parallel connection of resistor 31 and capacitor 47.

As described above, initially, when the main power switch 80 is turned "off", transistors 67 and 71 conduct causing capacitors 46 and 47 to discharge. When the main power switch 80 is turned "on", transistor 72 is turned "on" and remains on until capacitator 46 is charged through resistors 11 and 29, thus assuring that capacitor 48 is quickly charged through low value resistors 3 and 4. This effectively prevents the cart from lurching or moving should the main power switch 80 be in the "on" position when an operator connects either the main battery leads 93 and 94 to the battery terminals or the connector plug 280 to the cart circuit 100.

When capacitor 46 is fully charged, transistor 72 is turned "off" and is effectively removed from the circuit, causing potentiometer 99 and resistor 35 to control the charge rate of capacitor 48. Selection of a desired distance setting on knob control 199 causes an adjustment to be made to potentiometer 99, resulting in a change in the charge rate of capacitor 48 and a corresponding change in the distance traveled by golf club cart 100.

While the output of op-amp 78D is high, the diode 54 is reverse biased and transistor 75 will not conduct in the "send" mode. To cause the cart 200 to operate in the "send" mode, send/cancel switch 83 is momentarily switched into the "send" position 84. Simultaneously, the non-inverting terminal of op-amp 78D is shorted to the negative battery terminal 94 via conductor 174 causing diode 54 to be forward biased. This causes transistor 75 to turn "on" thus resulting in motors 230 and 235 being powered. When transistor 75 initially begins to conduct, capacitor 47 begins to be charged through resistor 13. Once capacitor 47 has fully charged, a voltage divider made up of resistors 13 and 31 continues to provide a constant voltage to the inverting input of op-amp 78D. Capacitor 47 additionally prevents the cart 200 from lurching forward should the main power switch 80 be in the "on" position when an operator connects either the main battery leads 93 and 94 to the battery terminals or the connector plug 280 to the cart circuit 100. When power is applied to the circuit, capacitor 47 momentarily grounds the inverting input of op-amp 78D while, simultaneously, the non-inverting input experiences a higher voltage due to the charging current of capacitor 48 through resistor 4. This initialization characteristic assures that, initially, the output of op-amp 78D is high, thereby keeping transistor 75 turned "off".

Transistor 75 will remain turned "on" until capacitor 48 is recharged. The values of capacitor 48 and resistor 4 are chosen to ensure that capacitor 48 is sufficiently, although not completely, discharged in the short time that the send/cancel switch 83 contact arm is in the send position 84. The capacitor 48 is recharged through potentiometer 99 and resistors 4 and 35. The location of the wiper of potentiometer 99 controls the maximum distance that the cart will travel before capacitor 48 is fully charged and transistor 75 is turned "off". Resistor 35 controls the minimum distance that the cart 200 will travel if potentiometer 99 is turned all the way in the clockwise direction causing it to have a minimal resistance.

To stop the cart at any time during the "send" mode of operation, the operator walking alongside the cart may press the send/cancel switch 83 into the "cancel" position 85, causing the capacitor 46 to discharge. Once capacitor 46 has discharged and the momentary switch has returned to the "off" position, transistor 72 is once again able to conduct, causing capacitor 48 to be rapidly charged through resistors 3 and 4, thus turning "off" transistor 75 and causing the cart 200 to stop moving.

"Cruise" Mode Operation

FIGS. 6 and 7 also show the "cruise" mode portion of cruise, send/cancel and handle control circuitry 140 for cart circuit 100. The "cruise" function of cart circuit 100 allows the cart motors 230 and 235 to be turned on for a predetermined amount of time and then automatically turns them "off". In the preferred embodiment, upon the receipt of a "cruise" command from the cart operator, the motors 230 and 235 are turned on for approximately three minutes to automatically move the cart the estimated length of a long fairway. After three minutes the cart will automatically stop. At that time, the cart 200 may again be operated in "cruise" mode by placing the cruise/handle toggle switch 86 into the "off" or "handle" position 88 and then back into the "cruise" position for another three minutes of applied power.

The "cruise" mode circuitry comprises an op-amp 78B, conductors 181 and 182, resistors 7, 14, 17, 18, 23, 25, 30 and 41, capacitor 50, pnp transistor 75, npn transistors 69 and 70, toggle switch 86, and diodes 52 and 53. When the cruise/handle toggle switch 86 is in either the "off" or "handle" position 88, transistors 69 and 70 are conducting and capacitor 50 is discharged through resister 7. Additionally, the output of op-amp 78B will be high, causing diode 53 to be reverse biased and preventing transistor 75 from conducting in the "cruise" mode absent further instructions from an operator.

When the cruise/handle toggle switch 86 is placed in the "cruise" position 87, transistors 69 and 70 are turned "off" and the capacitor 50 is charged through resistors 17 and 41. Resistor 41 is chosen to be significantly larger than resistor 17 and controls the charge rate of capacitor 50. In the preferred embodiment, resistor 41 is chosen to be less than 1.5M Ohms. Additionally, when cruise/handle toggle switch 86 is in the "cruise" position 87, the inverting terminal of op-amp 78B is supplied with a constant voltage from the voltage divider made up of resistors 23 and 30, while the signal at the non-inverting input drops significantly. This causes the output of op-amp 78B to be low, forward biasing diode 53 and resulting in conduction through transistor 75. Transistor 75 will turn "off" once capacitor 50 is fully charged. The charge time constant due to the series connection of capacitor 50 and resistor 41 determines the amount of time that cart 200 will travel. To restart the cart in "cruise" mode after the cart has traveled for one "cruise" mode period, it is necessary to switch toggle switch 86 to either the "off" or "handle" position 88 to allow the capacitor 50 to discharge. Switching the toggle switch 86 back to the "cruise" position 87 will again cause capacitor 50 to begin charge resulting in cart 200 moving forward along a straight or curved path for another three minutes.

Cart circuit 100 includes an additional battery reconnect safety feature. Regardless of the position of the switches on the control panel interface 215, the cart 200 will not start when the battery is first connected to cart circuit 100 absent a further command from the operator instructing it to do so. This safety feature protects the user standing in front of the cart from receiving an impact upon reconnection of a battery. Even if the main power switch 80 is turned "on", due to the normally "off" position of send/cancel switch 83, the cart will not operate in the "send" mode prior to receiving a command from an operator made after the battery has been reconnected. Likewise, if the cruise/handle toggle switch 86 is in either the "off" or the "handle" position 88 the cart 200 will not start without further commands from the operator instructing it to do so. However, if the main power switch 80 is "on" and the toggle switch 87 is in the "cruise" position 87, without further safeguards, the cart 200 would begin to operate in the "cruise" mode. The preferred embodiment of the present invention includes just such a safeguard in the form of power-on initialization circuitry. This additional circuitry prevents the cart 200 from operating in the "cruise" mode upon reconnection of the battery, absent additional instructions from the cart operator.

The power-on initialization circuitry is comprised of pnp transistor 73, resistors 12, 16, and 17, and capacitor 49. Initially, disconnection of the battery will allow both capacitors 49 and 50 to discharge. When the battery is reconnected to the cart circuit 100, capacitor 50 is rapidly charged through resistor 17 by transistor 73, thus preventing transistor 75 from conducting in the "cruise" mode. In order to operate the cart 200 in the "cruise" mode after the battery has been reconnected while the cruise/handle toggle switch 86 was in the "cruise" position 87, the toggle switch 86 must first be switched to either the "off" or the "handle" position 88, causing capacitor 50 to discharge, and then switched back to the "cruise" position 87. Without this power-on initialization circuitry, upon reconnection of the battery, capacitor 50 would charge through resistor 41 and the cart would begin to move, absent a further command from the operator to do so.

Capacitor 49 is discharged through resistor 6 and transistor 68 when the main power switch 80 is in the "off" position. This assures that when the main power switch 80 is switched to the "on" position and power is reapplied to the main portion of cart circuit 100, capacitor 50 is rapidly charged through transistor 73 and resistor 17. The rapid charging of capacitor 50 prevents the cart 200 from moving should the cruise/handle switch 86 be in the "cruise" position when the main power switch 80 is initially turned "on".

Figure 8:
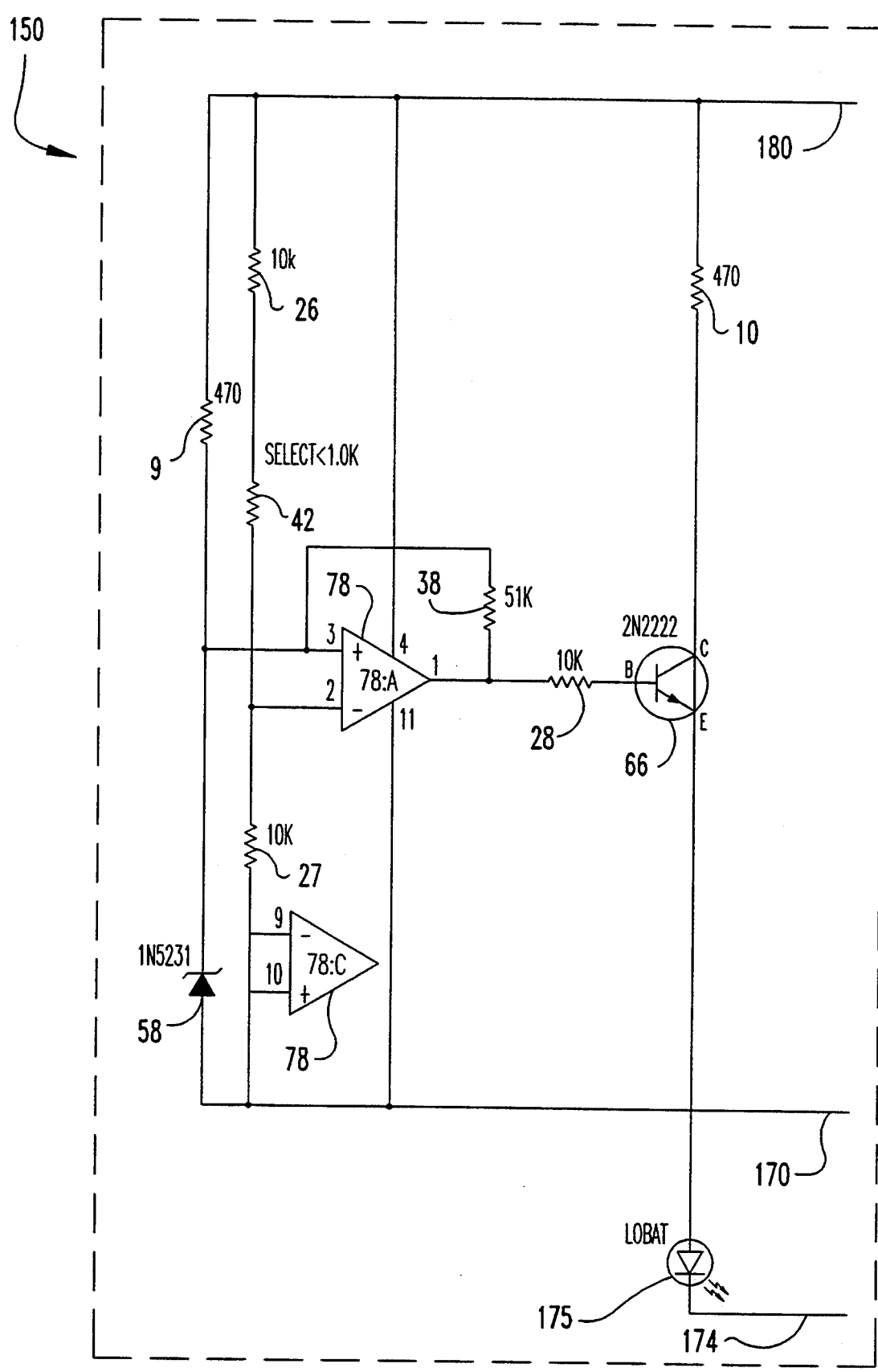
FIG. 8 is a schematic diagram of the low battery indicator circuitry portion of the electrical cart circuit of FIG. 3, which circuitry portion is capable of indicating when the battery powering the cart circuit is below a predetermined level.

Referring now to FIG. 8 there is shown the low battery indicator circuitry 150 of the cart circuit 100. When the main power switch is in the "on" position, power is supplied to the low battery circuitry 150 via conductor 180. The low battery circuitry 150 comprises op-amp 78A of quad op-amp 78, resistors 9, 10, 26, 27, 28, 38 and 42, zener diode 58, transistor 66 and LED 175. The +VCC terminal of quad op-amp chip 78 is shown connected to conductor 180. Likewise, the −VCC terminal of quad op-amp chip 78 is connected to the negative battery terminal via conductor 170. Op-amp 78C is effectively removed from the circuit by shorting input leads 9 and 10 to produce a zero output voltage. Resistors 26 and 42 connected in series and resistor 27 combine to form a voltage divider which provides an input voltage which is a fraction of the battery voltage to the inverting input of op-amp 78A. In the preferred embodiment resistor 42 is chosen to be less than 1.0K Ohms. The non-inverting terminal of op-amp 78A is connected between a resistor 9 and a zener diode 58. While the voltage at the zener diode 58 is greater than the inverting input voltage of op-amp 78A, the voltage at the non-inverting input terminal of op-amp 78A will remain constant at the zener voltage. Initially, the voltage at the inverting terminal of op-amp 78A may be greater than the voltage at the non-inverting terminal and transistor 66 will not conduct. As the battery level drops, the input to the inverting terminal of the op-amp 78A will drop while the voltage at the non-inverting input will remain constant at the zener voltage. At some decreased battery voltage level, the output of the op-amp 78A will be sufficient to cause transistor 66 to turn "on" and LED 175 will be lit.

In addition, when the output of op-amp 78A becomes more positive, hysteresis resistor 38 provides additional current to the zener reference diode 58, so that the cathode voltage of the zener becomes more positive than existed before when the battery terminal voltage is at full charge. This additional cathode voltage causes the non-inverting input of 78A to jump higher than the decreasing fractional value of battery terminal voltage as presented to the inverting input of 78A by the voltage divider comprised of resistors 26, 27, and 42. These characteristics assure a crisp turn-on of LED 175. The lighting of LED 175 serves to inform the cart operator that the battery powering cart 200 is below a predetermined threshold voltage level and should be replaced or recharged.

Table 1 provides a complete list of selected parts for the motorized golf cart circuit of FIGS. 3 through 8.

TABLE 1

| DESCRIPTION | REFERENCE DESIGNATION |
| --- | --- |
| CAPACITOR, 0.1 UF | 43 |

TABLE 1-continued

| DESCRIPTION | REFERENCE DESIGNATION |
| --- | --- |
| CAPACITOR, 10 UF | 46, 47 |
| CAPACITOR, 47 UF | 48 |
| CAPACITOR, 100 UF | 49, 50, 51 |
| DIODE, 1N4148 | 52, 53, 54, 55, 56, 57 |
| DIODE, 1N4004 | 61 |
| DIODE, MBR1635 | 62, 63 |
| FUSE, 20A | 95, 96 |
| FUSE, 7A | 97, 98 |
| MOMENTARY SWITCH | 83 |
| MOSFET, IRFZ34 | 76, 77 |
| NPN TRANSISTOR, 2N2222 | 66, 67, 68, 69, 70, 71 |
| PNP TRANSISTOR, 2N2907 | 72, 73, 74 |
| PNP TRANSISTOR, TIP127 | 75 |
| 14 PIN QUAD OP-AMP CHIP, | 78, 79 |
| POTENTIOMETER, 10K Ohms | 45 |
| POTENTIOMETER, 25K Ohms | 44 |
| POTENTIOMETER, 100K Ohms | 99 |
| RESISTORS, 1 Ohm | 1, 2 |
| RESISTORS, 100 Ohms | 3, 4, 5, 6, 7, 8 |
| RESISTOR, 470 Ohms | 9, 10 |
| RESISTOR, 1K Ohms | 11, 12, 13, 14, 15 |
| RESISTOR, 2K Ohms | 16, 17, 18, 19, 20, 21, 22, 23 |
| RESISTOR, 6.2K Ohms | 24, 25 |
| RESISTOR, 10K Ohms | 26, 27, 28, 29, 30, 31, 32, 33, 34 |
| RESISTOR, 20K Ohms | 35 |
| RESISTOR, 39K Ohms | 36, 37 |
| RESISTOR, 51K Ohms | 38, 39 |
| RESISTOR, 510K Ohms | 40 |
| RESISTOR, LESS THAN 1.0K Ohms | 42 |
| RESISTOR, LESS THAN 1.5M Ohms | 41 |
| ZENER DIODE, 1N5231 | 58 |
| ZENER DIODE, 1N5244 | 59, 60 |
| ZENER DIODE, 1N6386 | 62, 63 |

While the invention has been illustrated and described in detail in the drawings and foregoing description, the same is to be considered as illustrative and not restrictive in character. For example, although cart circuit 100 is implemented using analog circuit techniques, it could also be implemented using digital circuit techniques. It being understood that only the preferred embodiment has been shown and described and that all changes and modifications that come within the spirit of the invention are desired to be protected.

What is claimed is:

1. An electrical circuit apparatus for use with a motorized cart having first and second wheels separated by a cart body and located along a first axis and additionally having a third wheel located along an axis perpendicular to said first axis, said cart suitable for carrying golf clubs, comprising:

motor means for moving said first and second wheels of said cart;

switch means for enabling in a first mode of operation said motor means to move said cart only while said switch means is held closed by a cart operator;

first timer means for enabling in a second mode of operation said motor means to move said cart for a predetermined amount of time without further assistance from said cart operator; and distance timer means separate from said first timer means for enabling in a third mode of operation said motor means to move said cart a distance determined by said cart operator and without further assistance from said cart operator.

2. The electrical circuit apparatus of claim 1 wherein the predetermined amount of time that said first timer means enables said motor means is determined by the charge rate of a capacitor connected in series with a first resistance.

3. The electrical circuit apparatus of claim 2 wherein said charge rate is calculated so as to enable said motor means to move said cart for approximately three minutes.

4. The electrical circuit apparatus of claim 1 wherein the distance traveled by said cart is determined by the charge time of a distance capacitor connected in series with a second resistance.

5. The electrical circuit apparatus of claim 4 wherein said second resistance comprises at least one resistor connected in series with a potentiometer the resistance of which is set by the cart operator.

6. The electrical circuit apparatus of claim 5 wherein said distance timer means additionally comprises a cancel means for disabling said motor means upon the receipt of a command from the cart operator before said cart has traveled the full distance determined by said second resistance.

7. The electrical circuit apparatus of claim 6 wherein said cancel means includes a transistor for rapidly charging said distance capacitor through a third resistance connected in parallel with said second resistance and in series with said distance capacitor, said third resistance being much smaller than said second resistance.

8. The electrical circuit apparatus of claim 1 wherein said distance timer means additionally comprises a cancel means for disabling said motor means upon the receipt of a command from the cart operator before said cart has traveled the full distance.

9. The electrical circuit apparatus of claim 1 additionally comprising dynamic braking means for preventing said cart from moving when said motor means is not enabled.

10. The electrical circuit apparatus of claim 1 having a low battery indicator means for indicating when the voltage supplied by a battery providing power to said cart falls below a predetermined level.

11. The electrical circuit apparatus of claim 1 having a soft-start means to cause said motor means to initially start said cart slowly to prevent said cart from lurching forward suddenly when said motor means is first enabled.

12. The electrical circuit apparatus of claim 11 wherein said soft-start means includes a capacitor and an oscillator, wherein said capacitor causes the output from said oscillator to enable said motor means to operate in a linear fashion.

13. The electrical circuit apparatus of claim 1 additionally including a first battery safety means for disabling the electrical circuit of said apparatus when a battery connected to said electrical circuit is connected such that the polarities at said battery leads are opposite the polarities needed to power said electrical circuit.

14. The electrical circuit apparatus of claim 13 wherein said first battery safety means includes a diode having an anode connected to a positive battery terminal.

15. The electrical circuit apparatus of claim 1 having second battery safety means for preventing the movement of said cart after a battery has been inserted into said cart until a new command has been entered by said operator.

16. The electrical circuit apparatus of claim 1 additionally comprising variable speed control means for controlling the rate of travel of said cart.

17. The electrical circuit apparatus of claim 16 wherein said motor means comprises a first motor for turning the first wheel of said cart and a second motor for turning the second wheel of said cart.

18. The electrical circuit apparatus of claim 17 wherein said motor means additionally comprises a turning means for causing said cart to follow a curved path of travel.

19. The electrical circuit apparatus of claim 18 wherein said variable speed control means includes a first potentiometer and wherein said turning means comprises a second potentiometer, the output of said first potentiometer being connected to the wiper of said second potentiometer which is adjusted to distribute power to said first and second motors proportionally with respect to each other.

20. The electrical circuit apparatus of claim 1 wherein the electrical circuit of said apparatus implemented using only analog and discrete circuit elements.

21. A motorized cart apparatus suitable for carrying golf clubs, comprising:
  cart means for supporting said golf clubs;
  cart moving means for propelling said cart means according to instructions obtained from a cart operator, said cart moving means including:
    first and second wheels separated by a body portion of said cart means and located along a first axis through said body portions;
    a third wheel located along a second axis perpendicular to said first axis; and
    motor means connected between said first wheel and said second wheel, said motor means including:
      speed control means for controlling the speed at which said motorized cart apparatus travels, said speed control means including a first potentiometer;
      first motor means for moving said first wheel located upon a first side of said body portion of said cart means; and
      second motor means for moving said second wheel located on a second side of said body portion of said cart means;
  direction control means for increasing the power supplied to either said first motor means or said second motor means resulting in a corresponding decrease in the power supplied to said second motor means or said first motor means to cause said motorized cart apparatus to follow a curved path of travel wherein the curvature of the path depends upon the proportion of power sent to said first motor means with respect to said second motor means, said direction control means additionally including a second potentiometer, wherein the output of said first potentiometer in said speed control means is input to the wiper of said second potentiometer, the setting of which determines the proportion of power sent to said first and second motor means;
  battery means for powering said motor means; and
  power-on initialization means for insuring that said motorized cart apparatus does not start unintentionally absent a command from the cart operator upon connection of said battery means to said motor means.

* * * * *